(12) United States Patent
Matsui et al.

(10) Patent No.: US 12,290,021 B2
(45) Date of Patent: May 6, 2025

(54) CONTROL DEVICE AND WORK MACHINE

(71) Applicant: HONDA MOTOR CO., LTD., Tokyo (JP)

(72) Inventors: Yuki Matsui, Wako (JP); Hideaki Shimamura, Wako (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 288 days.

(21) Appl. No.: 17/856,195

(22) Filed: Jul. 1, 2022

(65) Prior Publication Data

US 2022/0330477 A1    Oct. 20, 2022

Related U.S. Application Data

(63) Continuation of application No. PCT/JP2020/000508, filed on Jan. 9, 2020.

(51) Int. Cl.
*A01D 34/00* (2006.01)
*A01D 101/00* (2006.01)
*G05D 1/00* (2006.01)

(52) U.S. Cl.
CPC ......... *A01D 34/008* (2013.01); *G05D 1/0088* (2013.01); *A01D 2101/00* (2013.01)

(58) Field of Classification Search
CPC . A01D 34/008; A01D 2101/00; G05D 1/0088
See application file for complete search history.

(56) References Cited

U.S. PATENT DOCUMENTS

| | | | | |
|---|---|---|---|---|
| 4,573,547 A | * | 3/1986 | Yoshimura | G05D 1/0259 180/401 |
| 5,870,303 A | | 2/1999 | Trovato et al. | |
| 9,888,625 B2 | | 2/2018 | Yamamura | |
| 2009/0265053 A1 | * | 10/2009 | Dix | G05D 1/0219 701/26 |
| 2014/0012453 A1 | * | 1/2014 | Johnson | G05D 1/0265 701/23 |
| 2016/0227704 A1 | | 8/2016 | Yamamura | |
| 2019/0216003 A1 | * | 7/2019 | Green | A01B 79/005 |

(Continued)

FOREIGN PATENT DOCUMENTS

| | | |
|---|---|---|
| EP | 3579075 A1 | 12/2019 |
| JP | S61-282299 A | 12/1986 |
| JP | H02-238506 A | 9/1990 |

(Continued)

OTHER PUBLICATIONS

International Search Report for PCT/JP2020/000508 mailed Mar. 10, 2020 with partial English Translation.

*Primary Examiner* — Dale W Hilgendorf
*Assistant Examiner* — Hana Lee
(74) *Attorney, Agent, or Firm* — Thomas Horstemeyer, LLP

(57) ABSTRACT

A control device for executing travel control of a self-propelled work machine, comprising a turning unit that turns the work machine such that the work machine travels inside a boundary of a work region, an evaluation unit that evaluates complexity of a shape of the boundary in the work region, and a changing unit that changes a turning mode of the work machine when the work machine is turned based on an evaluation result by the evaluation unit.

12 Claims, 9 Drawing Sheets

(56) References Cited

U.S. PATENT DOCUMENTS

2019/0346848 A1* 11/2019 Zhou .................. G05D 1/0088
2020/0064832 A1    2/2020 Matsui et al.

FOREIGN PATENT DOCUMENTS

| | | |
|---|---|---|
| JP | H09-204224 A | 8/1997 |
| JP | 2013-097767 A | 5/2013 |
| JP | 2016-148937 A | 8/2016 |
| WO | 2018/142791 A1 | 8/2018 |
| WO | 2021/140628 A1 | 7/2021 |

* cited by examiner

FIG. 3A1  START TURNING  SHARP TURNING (TURNING RADIUS r1)

FIG. 3A2  START TURNING  GENTLE TURNING (TURNING RADIUS r2)

FIG. 3B1  LARGE TURNING (TURNING ANGLE Φ1)

FIG. 3B2  SMALL TURNING (TURNING ANGLE Φ2)

F I G. 4A
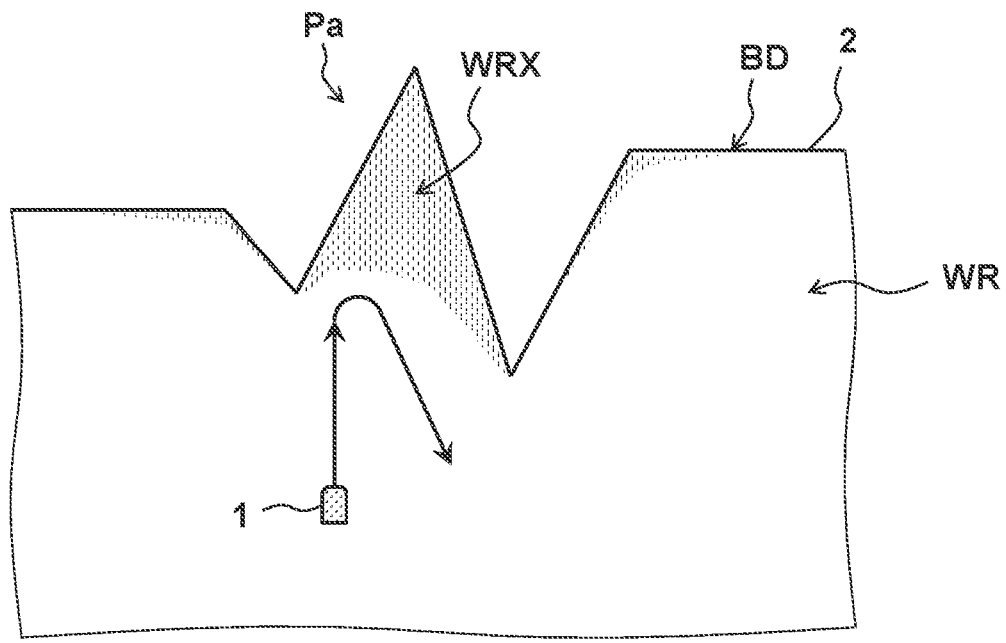
F I G. 4B
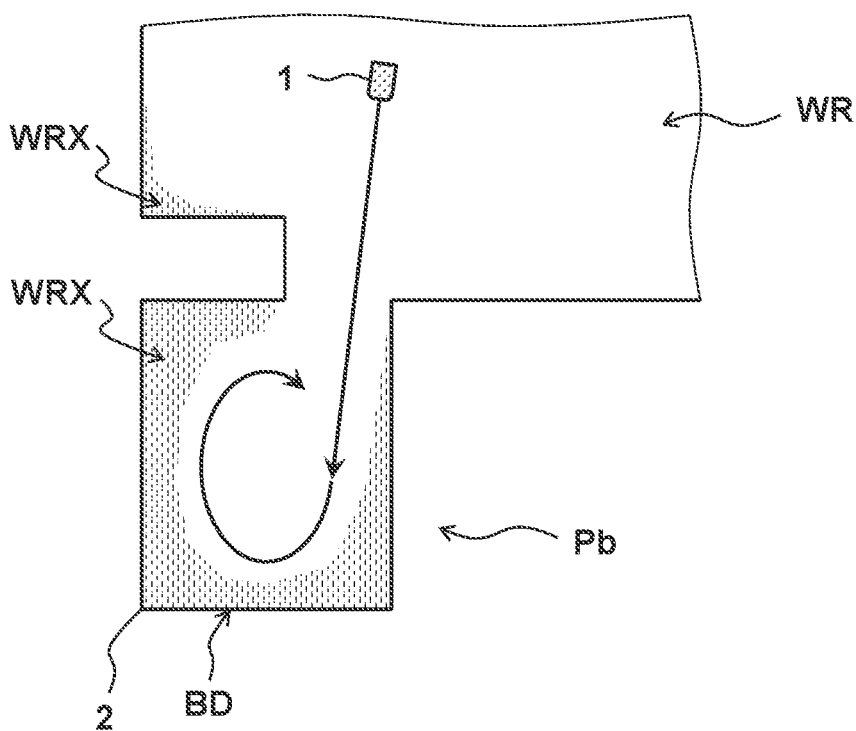

FIG. 6

|  | TA1 | TA2 | TA3 |
|---|---|---|---|
| SHARP TURNING (r1) AND LARGE TURNING (Φ1) | ○ | ○ | ○ |
| SHARP TURNING (r1) AND SMALL TURNING (Φ2) | ○ | ◎ | ○ |
| GENTLE TURNING (r2) AND LARGE TURNING (Φ1) | ○ | △ | × |
| GENTLE TURNING (r2) AND SMALL TURNING (Φ2) | ○ | △ | × |

○ : SELECTABLE
◎ : PREFERENTIALLY SELECTED
△ : SELECTED AT LOW FREQUENCY
× : NOT SELECTABLE

CONTROL DEVICE AND WORK MACHINE

CROSS-REFERENCE TO RELATED APPLICATION(S)

This application is a continuation of International Patent Application No. PCT/JP2020/000508 filed on Jan. 9, 2020, the entire disclosures of which is incorporated herein by reference.

TECHNICAL FIELD

The present invention mainly relates to a control device for executing travel control of a self-propelled work machine.

BACKGROUND ART

Some work machines (for example, lawn mowers) detect a work region by themselves and perform work (for example, lawn mowing) in the work region. According to Patent Literature 1, the work region is partitioned by a wire, and the work machine detects an electromagnetic wave generated by the wire. The work machine can maintain traveling in the work region by performing a turning operation before the boundary (position overlapping the wire) of the work region based on the electromagnetic wave. Such a work machine is also referred to as a self-propelled work machine, an unmanned traveling work machine, or the like.

CITATION LIST

Patent Literature

PTL1: Japanese Patent Laid-Open No. 2016-148937

SUMMARY OF INVENTION

Technical Problem

It is conceivable that the outer shape (shape of the boundary) of the above-described work region becomes complicated depending on the geographical conditions. In such a case, it is generally conceivable that the turning cannot be appropriately achieved in the complicated portion, and accordingly, it becomes difficult to appropriately continue the work, and these may cause a decrease in work efficiency.

An object of the present invention is to improve work efficiency of a self-propelled work machine in various work regions.

Solution to Problem

A first aspect of the present invention is a control device for executing travel control of a self-propelled work machine, the control device comprising a turning unit that turns the work machine such that the work machine travels inside a boundary of a work region, an evaluation unit that evaluates complexity of a shape of the boundary in the work region, and a changing unit that changes a turning mode of the work machine when the work machine is turned based on an evaluation result by the evaluation unit.

Advantageous Effects of Invention

According to the present invention, it is possible to improve the work efficiency of the self-propelled work machine in various work regions.

BRIEF DESCRIPTION OF DRAWINGS

FIG. 3A1 is a diagram showing a turning mode of the work machine.

FIG. 3A2 is a diagram showing a turning mode of the work machine.

FIG. 3B1 is a diagram showing a turning mode of the work machine.

FIG. 3B2 is a diagram showing a turning mode of the work machine.

FIG. 4A is a diagram showing an example of a situation that may occur when an outer shape of a work region is complicated.

FIG. 4B is a diagram showing an example of a situation that may occur when the outer shape of the work region is complicated.

FIG. 6 is a diagram showing an example of a reference table.

DESCRIPTION OF EMBODIMENTS

Figure 1:
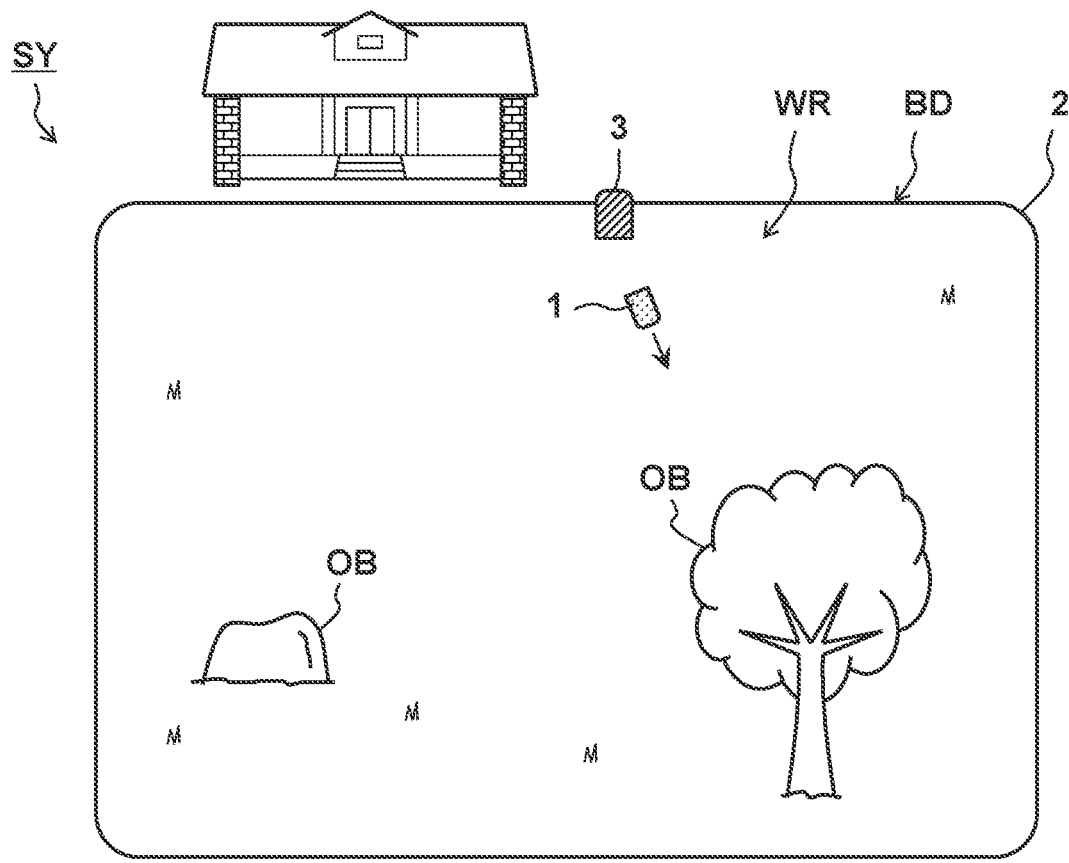
FIG. 1 is a diagram showing a configuration example of a work system.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

(Configuration Example of Work System)

FIG. 1 is a schematic diagram showing a configuration example of a work system SY according to an embodiment. The work system SY includes a work machine 1, an area wire 2, and a station 3. Although details will be described later, the work machine 1 is configured to be capable of executing predetermined work, and in the present embodiment, the work machine 1 is a lawn mower that performs lawn mowing as work content.

The area wire 2 can be installed (for example, laid, buried) so as to partition a work region WR. A predetermined electric power is supplied to the area wire 2, whereby the area wire 2 generates an electromagnetic wave. Although details will be described later, the work machine 1 performs work while maintaining traveling in the work region WR based on the electromagnetic wave. The area wire 2 may be simply expressed as a wire.

The station 3 is usually installed at an edge of the work region WR, and is configured to enable the work machine 1 in a non-working state to be on standby and to enable charging of a battery (a battery 16 to be described later) included in the work machine 1. The station 3 may be expressed as a charging station or the like. The above-described area wire 2 is electrically connected to the station 3, and generates an electromagnetic wave by receiving electric power supply from the station 3.

(Configuration Example of Work Machine)

Figure 2:
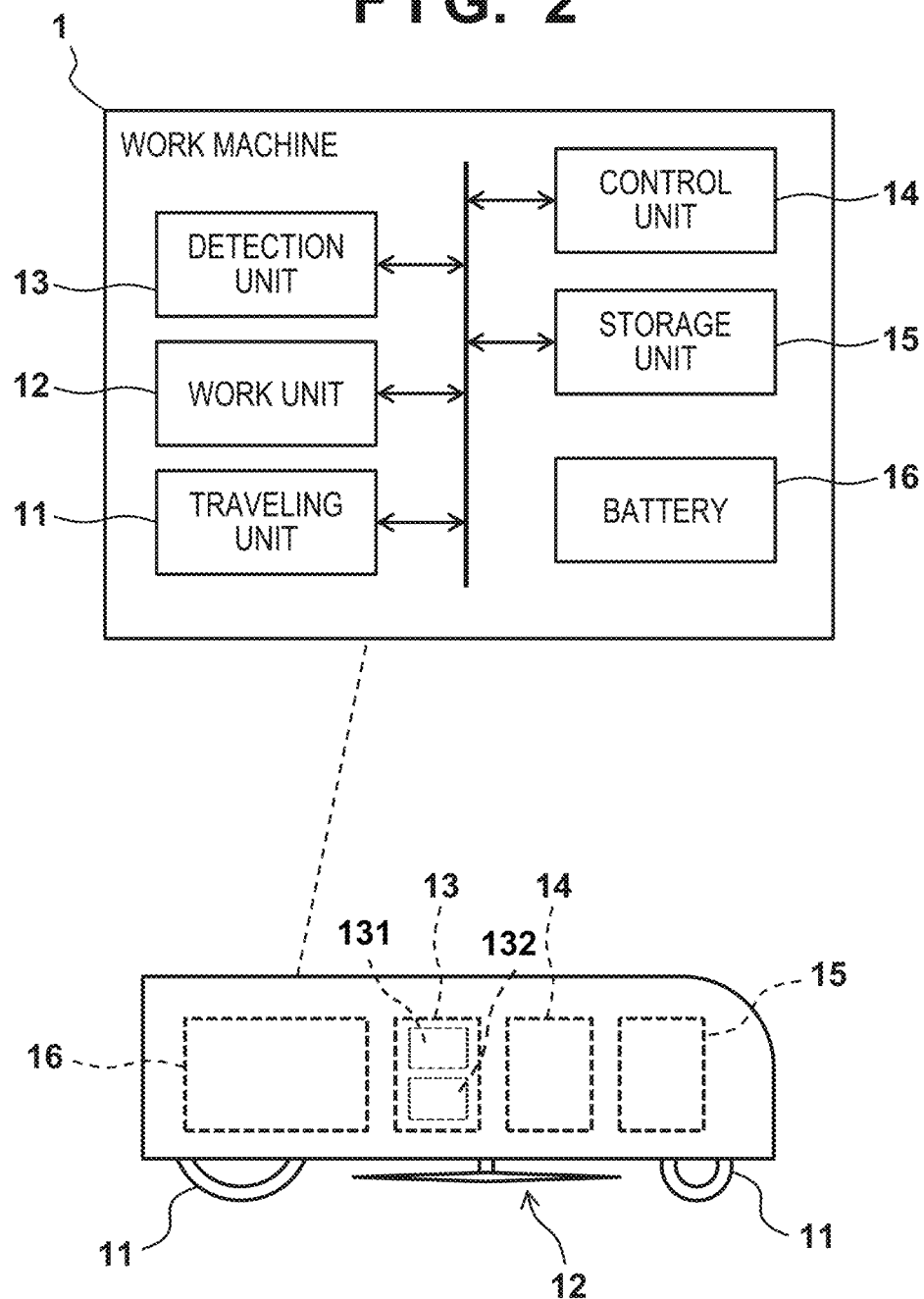
FIG. 2 is a block diagram showing a configuration example of a work machine.

FIG. 2 is a block diagram showing a configuration example of the work machine 1. The work machine 1 includes a traveling unit 11, a work unit 12, a detection unit 13, a control unit 14, a storage unit 15, and a battery 16.

The traveling unit 11 is provided at a lower part of the vehicle body of the work machine 1, and is configured to be capable of executing forward movement, backward movement, and turning (left turning/right turning) of the work machine 1. In the present embodiment, a total of four wheels including two front wheels that are driven wheels and two rear wheels that are drive wheels are used as the traveling unit 11 to achieve a four-wheel drive. However, the number of the wheels is not limited to this. The turning here can be interpreted in a broad sense, and includes, for example, not only changing the traveling direction by driving the left and right wheels in the same rotation direction and at different rotation speeds from each other (with a movement in a front-and-rear direction of the vehicle body) but also making a direction change by driving the left and right wheels at the same rotation speed and in different rotation directions from each other (without a movement in the front-rear direction of the vehicle body), that is, so-called a spin turn. As another embodiment, a crawler-type traveling body may be used instead of the traveling unit 11 with which four-wheel travel is achievable.

The work unit 12 is provided at a lower part of the vehicle body of the work machine 1, and is configured to be capable of executing the predetermined work (here, lawn mowing). A known work mechanism is used for the work unit 12, and in the present embodiment, a disk-shaped lawn mowing blade and an electric motor that can rotate and raise and lower the blade are used. The blade is lowered to be in a rotating state at the time of working (operating state), and is raised to be in a non-rotating state at the time of non-working (non-operating state). The work machine 1 travels in the work region WR while maintaining the work unit 12 in the operating state, and thus executes the lawn mowing in the region where the work machine 1 has passed.

The detection unit 13 is configured to acquire information for appropriately maintaining traveling of the work machine 1, and includes an electromagnetic wave detection unit 131 and a vibration detection unit 132 in the present embodiment.

The electromagnetic wave detection unit 131 detects an electromagnetic wave generated by the area wire 2. This electromagnetic wave shows, for example, a positive value in the work region WR and a negative value outside the work region WR, and its intensity (absolute value) is generally larger toward a boundary BD of the work region WR. Here, the boundary BD corresponds to the outer shape of the work region WR, and substantially overlaps the area wire 2 in top view. The work machine 1 turns as described later based on the detection result by the electromagnetic wave detection unit 131, and maintains traveling in the work region WR.

The vibration detection unit 132 can detect vibration or impact applied to the vehicle body of the work machine 1. For example, the work machine 1 that is traveling detects contact with an obstacle OB (for example, a stone) that hinders the traveling by the vibration detection unit 132. In response to this, the work machine 1 temporarily stops and then turns as described later, thereby avoiding the obstacle OB. As the vibration detection unit 132, for example, a displacement sensor that detects a displacement of relative positions between the main body of the work machine 1 and the exterior cover may be used, or a known vibration detecting sensor such as an acceleration sensor may be used.

The control unit 14 performs drive control of the traveling unit 11 based on the detection result by the detection unit 13. For example, when the boundary BD of the work region WR is detected by the electromagnetic wave detection unit 131, the control unit 14 turns the work machine 1 before the boundary BD. That is, in response to the detection of the boundary BD, the control unit 14 controls the traveling unit 11 so as to avoid the intersection between the work machine 1 and the boundary BD (the work machine 1 from straddling the boundary BD), and turns the work machine 1. Details of this turning mode will be described later.

In the present embodiment, the control unit 14 is a processor including a CPU and a memory, and functions thereof are implemented by executing a predetermined program. As another embodiment, the control unit 14 may include a semiconductor device such as a programmable logic device (PLD) or an application specific semiconductor integrated circuit (ASIC). That is, the function of the control unit 14 is achievable by any of hardware and software. Note that the control unit 14 may be expressed as a control device, a processing unit, a processing device, a travel control unit, a travel control device, or the like.

Although details will be described later, the storage unit 15 stores a travel control parameter used at the time of the above-described turning by the work machine 1, that is, at the time of driving control of the traveling unit 11 by the control unit 14. It is sufficient if a nonvolatile memory such as an electrically erasable programmable read only memory (EEPROM) is used for the storage unit 15.

The battery 16 can supply electric power corresponding to each of the traveling unit 11, the work unit 12, the detection unit 13, the control unit 14, and the storage unit 15 via a known voltage converter. As described above, the battery 16 is configured to be chargeable while the work machine 1 is on standby in the station 3. For example, a secondary battery such as a lithium-ion battery can be used for the battery 16.

(Summary of Work Mode of Work Machine)

With the above-described configuration, the work machine 1 can appropriately perform predetermined work (lawn mowing in this case) while traveling in the work region WR. For example, at the work start time, the work machine 1 enters the work region WR from the station 3, turns to adjust the posture, and then performs the work while moving straight (forward). Thereafter, when the work machine 1 detects the boundary BD, the work machine 1 turns before the boundary BD in response to the detection to avoid the intersection with the boundary BD, and/or when the work machine 1 detects the obstacle OB, the work machine 1 turns in response to the detection to avoid the obstacle OB. Thereafter, the work machine 1 performs the work while moving straight again. By repeating such an operation, the work machine 1 executes work while appropriately maintaining traveling in the work region WR, and the work is continued until the work end time. When the work end time comes, the work machine 1 returns to the station 3, and the battery 16 is charged until the next work start time. Such a work machine 1 can be expressed as a self-propelled work machine, an unmanned traveling work machine, or the like.

(Turning Mode of Work Machine)

In the present embodiment, the turning is achieved by selecting and executing one of various turning methods with a predetermined probability. According to such a turning mode, the work without unevenness is performed in the entire work region WR in the long term.

As an example, a turning radius at the time of turning (a curvature radius of an arc-shaped travel route drawn in a top view when the work machine 1 turns) is arbitrarily selected within a predetermined range. That is, the turning may be performed with a relatively small turning radius r1 as shown in FIG. 3A1, or may be executed with a relatively large turning radius r2 (>r1) as shown in FIG. 3A2.

As another example, the turning angle at the time of turning (the angle formed by the traveling direction before turning and the traveling direction after turning) is arbitrarily selected within a predetermined range. That is, the turning may be performed at a relatively large turning angle Φ1 as shown in FIG. 3B1, or may be executed at a relatively small turning angle Φ2 (<Φ1) as shown in FIG. 3B2.

For ease of description, hereinafter, the turning at the turning radius r1 is expressed as "sharp turning", the turning at the turning radius r2 is expressed as "gentle turning", the turning at the turning angle Φ1 is expressed as "large turning", and the turning at the turning angle 12 is expressed as "small turning" (r1<r2, Φ1>Φ2). Here, as examples of the turning radius and the turning angle, two types of r1 and r2 are exemplified for the turning radius, and two types of Φ1 and 12 are exemplified for the turning angle, but the present invention is not limited thereto.

The above several turning methods (here, sharp turning, gentle turning, large turning, and small turning) may have different effects on the work. For example, the sharp turning can be started at a position relatively close to the boundary BD of the work region WR. Therefore, the sharp turning is advantageous for performing work up to the vicinity of the boundary BD, but tends to cause work unevenness (local work failure) at a position (for example, central region) away from the work region WR. On the other hand, since the gentle turning needs to be started at a position before the boundary BD as compared with the case of the sharp turning, the tendency opposite to the sharp turning can be exhibited.

In addition, for example, in the large turning, the region where the work is executed is relatively close before and after the turning. Therefore, the large turning is advantageous for uniformly performing the work in the small-scale work region WR in a short time, but tends to cause work unevenness when the similar work is performed in the large-scale work region WR. On the other hand, in the small turning, since the region where the work is executed can be separated before and after the turning, the tendency opposite to the large turning can be exhibited.

Therefore, in the present embodiment, the above several turning methods are selectively executed based on a predetermined probability. That is, when the boundary BD is detected by the electromagnetic wave detection unit 131, the work machine 1 executes one of the sharp turning and the gentle turning by one of the large turning and the small turning based on a predetermined probability before the boundary BD. Which one of the sharp turning and the gentle turning is executed by the large turning or the small turning may be determined using, for example, a random number, may be determined based on the execution history of the turning, or may be changed with the lapse of time as a trigger. When the obstacle OB is detected by the vibration detection unit 132, the work machine 1 is assumed to execute the sharp turning (substantially a super-signal turning or a turning after backward movement by a predetermined distance) by one of the large turning and the small turning based on a predetermined probability. According to such a turning mode, the work without unevenness is performed in the entire work region WR in the long term.

By the way, according to the above-described turning mode, in a case where the shape of the boundary BD, which is the outer shape of the work region WR, is complicated, it may be difficult to appropriately continue the work. Examples thereof include that it becomes difficult for the work machine 1 to enter a complicated portion Pa of the work region WR (see FIG. 4A), that it becomes difficult for the work machine 1 to get out of a complicated portion Pb although entering the complicated portion Pb (see FIG. 4B), and the like. That is, in the example of FIG. 4A, as a result of selecting the gentle turning and the large turning or the small turning, a work failure WRX may occur in the complicated portion Pa. In addition, in the example of FIG. 4B, as a result of continuously selecting the gentle turning and the large turning or the small turning, the work machine 1 may not be able to reach the exit from the complicated portion Pb and stay in the portion Pb for a relatively long time. In addition, it may be difficult to achieve the entry itself of the work machine 1 into the portion Pb. Since these factors cause a decrease in work efficiency, the turning may be achieved in the following mode in order to avoid such a situation.

Figure 5:
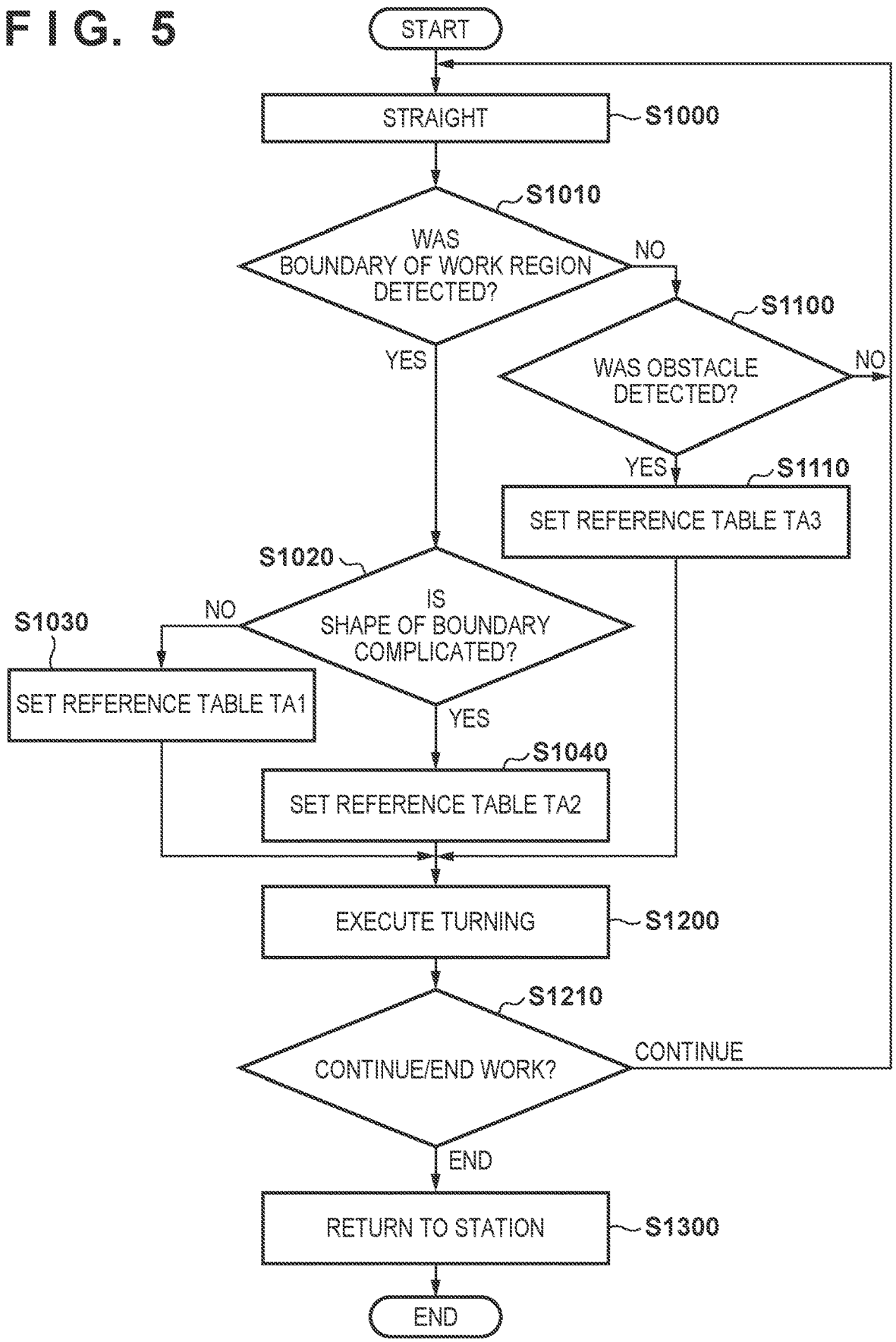
FIG. 5 is a flowchart showing the contents of travel control of the work machine.

FIG. 5 is a flowchart showing the contents of travel control of the work machine 1 according to the present embodiment. The contents of this flowchart are mainly executed by the control unit 14, and the outline thereof is to change the turning mode of the work machine 1 when a portion in which the shape of the boundary BD is complicated is detected while the work machine 1 is working in the work region WR. This flowchart is executed at the start of work of the work machine 1.

In step S1000 (hereinafter, simply referred to as "S1000", and this applies to other steps to be described later), the work machine 1 is moved straight, and the process proceeds to S1010. The process may proceed to step S1010 in response to the fact that the work machine 1 moves straight for a predetermined distance, or may proceed in response to a lapse of a predetermined time.

In S1010, the presence or absence of the detection of the boundary BD of the work region WR is determined based on the detection result of the electromagnetic wave detection unit 131. As described above, the intensity of the electromagnetic wave generally increases as approaching the boundary BD of the work region WR. Therefore, the determination in S1010 may be made based on whether the intensity of the electromagnetic wave detected by the electromagnetic wave detection unit 131 is larger than the criterion. When the boundary BD is detected, the process proceeds to S1020. Otherwise, the process proceeds to S1100.

In S1020, it is determined whether the shape of the boundary BD detected in S1010 is complicated. Although details of this determination method will be described later, when it is determined that the shape of the boundary BD is not complicated, the process proceeds to S1030, and when it is determined that the shape of the boundary BD is complicated, the process proceeds to S1040.

Note that, here, for ease of understanding, whether the shape of the boundary BD is complicated is determined, but the complexity of the shape may be evaluated and classified into a plurality of levels based on the degree of the complexity. In this case, relative evaluation is performed, for example, as to which of a plurality of criteria is complicated.

In S1030, a reference table (Table TA1) for determining the turning method is set. In the reference table TA1, as shown in FIG. 6, "sharp turning and large turning", "sharp turning and small turning", "gentle turning and large turning", and "gentle turning and small turning" are all set to "0 (selectable)", and any of these is selected with the same probability.

In S1040, another reference table (Table TA2) for determining the turning method is set. The reference table TA2 has contents different from those of the table TA1 described above. In the reference table TA2, as shown in FIG. 6, "sharp turning and small turning" is set to "0 (preferentially selected)", that is, this is likely to be selected than "sharp turning and large turning" set to "0 (selectable)". In addition, "gentle turning and large turning" and "gentle turning and small turning" are set to "A (selected at low frequency)", and these are less likely to be selected than "sharp turning and large turning" and "sharp turning and small turning".

In S1100, the presence or absence of the detection of the obstacle OB is determined based on the detection result of the vibration detection unit 132. When the obstacle OB is detected, the process proceeds to S1110. Otherwise, the process returns to S1000.

In S1110, another reference table (Table TA3) for determining the turning method is set. The reference table TA3 has contents different from those of the tables TA1 and TA2 described above. In the reference table TA3, as shown in FIG. 6, "sharp turning and large turning" and "sharp turning and small turning" are set to "○ (selectable)", and any of these is selected with the same probability. Note that "gentle turning and large turning" and "gentle turning and small turning" are set to "x (not selectable)", and neither of them is selected.

In S1200, although details will be described later, turning is executed by a turning method based on the reference table TA1, TA2, or TA3 set in S1030, S1040, or S1110.

In S1210, it is determined whether to end/continue the work. This determination may be made based on whether the work end time has elapsed. When the work is continued, the process returns to S1000, and when the work is ended, the process proceeds to S1300.

In S1300, the work machine 1 is returned to the station 3, and this flowchart is ended. For example, the work machine 1 returns to the station 3 along the boundary BD while detecting the electromagnetic wave of the area wire 2. Thereafter, the work machine 1 is on standby in the station 3 until the next work start time, and during that time, the battery 16 is charged.

According to the travel control of the work machine 1 described above, when turning of the work machine 1 becomes necessary, the turning mode is changed based on details of a trigger or a cause thereof. In the present embodiment, the turning mode is changed by changing the selection probability when one of several turning methods is selected, and this is achievable by using any one of the reference tables TA1, TA2, and TA3. The reference tables TA1, TA2, and TA3 may be stored in advance in the storage unit 15, and one corresponding table (for example, the reference table TA1) may be read from the storage unit 15 in S1030, S1040, or S1110.

For example, in the reference table TA1, both in one of the four turning methods of "sharp turning and large turning", "sharp turning and small turning", "gentle turning and large turning", and "gentle turning and small turning" can be selected with a probability of 25%. For example, according to the reference table TA2, among the four turning methods, "sharp turning and large turning" can be selected with a probability of 70%, "sharp turning and small turning" can be selected with a probability of 20%, and "gentle turning and large turning" and "gentle turning and small turning" can be each selected with a probability of 5%. Further, for example, according to the reference table TA3, among the four turning methods described above, "sharp turning and large turning" and "sharp turning and small turning" are each selected with a probability of 50%, and "gentle turning and large turning" and "gentle turning and small turning" are not selected.

Note that the set value of the probability exemplified here can be changed according to a purpose or the like. Similarly, even in a case where the number of options of the turning radius and/or the turning angle is increased, the set value of the probability can be changed without departing from the gist described above.

In other words, from the viewpoint of the control unit 14, it can be said that the control unit 14 has two or more turning modes for turning the work machine 1 with different turning radii as a travel control mode. In the present embodiment, "sharp turning and large turning", "sharp turning and small turning", "gentle turning and large turning", and "gentle turning and small turning" are exemplified as the turning modes. By selecting one of these turning modes (arbitrarily) with a predetermined probability, the control unit 14 can achieve the work without unevenness in the entire work region in the long term. On the other hand, when the portion Pa or the like in which the shape of the boundary BD of the work region WR is complicated is detected, the work efficiency can be improved by changing the probability of the selection.

In the present embodiment, when the complicated portion Pa or the like is detected, the probability that "sharp turning and large turning" or "sharp turning and small turning" is selected is set higher than the probability that "gentle turning and large turning" or "gentle turning and small turning" is selected. That is, among a turning mode by "sharp turning and large turning" or "sharp turning and small turning" (this is referred to as a sharp turning mode) and a turning mode by "gentle turning and large turning" or "gentle turning and small turning" (this is referred to as a gentle turning mode), the probability of selecting the sharp turning mode is increased.

As described above, according to the present embodiment, when the work machine 1 approaches the boundary BD of the work region WR and the shape of the boundary BD is complicated (when the above-described portion Pa or the like is detected), the selection probability of the turning method is changed. As a result, it is possible to appropriately avoid a situation in which it becomes difficult to appropriately continue the work and to appropriately improve the work efficiency.

In the present embodiment, "sharp turning and large turning", "sharp turning and small turning", "gentle turning and large turning", and "gentle turning and small turning" are selected based on a predetermined probability, but the selection mode thereof may be changed with the lapse of time as a trigger. For example, the selection corresponding to "0", "0", and "A" in FIG. 6 may be performed in rotation for a working time of 5 minutes, 3 minutes, and 1 minute, respectively (the longer the time, the easier the selection). In short, it can be said that the frequency of the above-described selection is changed. That is, the above-described selection is not limited to the probability and frequency exemplified here, and may be performed based on some criterion, and this criterion may be changed when the complicated portion Pa or the like is detected.

Alternatively, the selection corresponding to "A" may be necessarily performed or may be easily performed according to the satisfaction of some condition such as the fact that the position of the work machine 1 in the work region WR does not substantially change over a predetermined time.

According to these selection modes, in the example of FIG. 4B (example in which the work machine 1 cannot reach the exit from the complicated portion Pb and stays in the part Pb for a relatively long time), the work machine 1 can get out of the portion Pb in a shorter time.

Figure 7A:
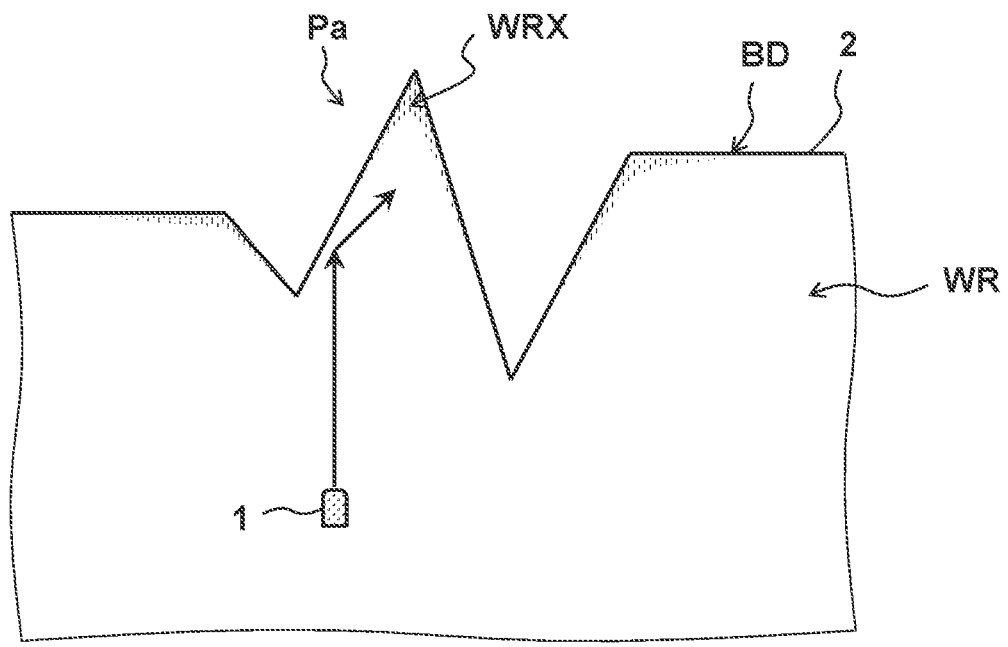
FIG. 7A is a diagram showing a turning mode of the work machine when the outer shape of the work region is complicated.

FIG. 7A shows a mode in which the work machine 1 can enter the complicated portion Pa of the work region WR as an example (comparison with FIG. 4A) based on the turning mode. According to the present embodiment, the sharp turning and the small turning are likely to be selected, and thus the possibility of entering the complicated portion Pa increases, and the work failure WRX in the portion Pa can be reduced. As a result, according to the present embodiment, the work efficiency is appropriately improved.

Figure 7B:
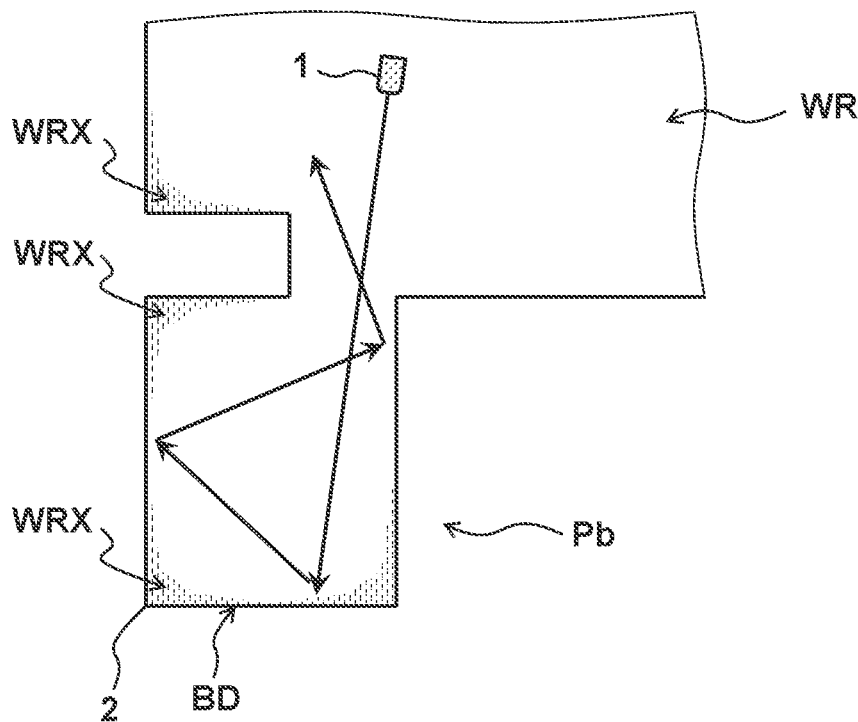
FIG. 7B is a diagram showing a turning mode of the work machine when the outer shape of the work region is complicated.

FIG. 7B shows, as another example (comparison with FIG. 4B) based on the turning mode, a mode in which the work machine 1 enters the complicated portion Pb and then gets out of the complicated portion Pb. According to the present embodiment, since the sharp turning and the small turning are likely to be selected, the possibility of entering the complicated portion Pb increases, and the work failure WRX in the portion Pb can be reduced. In addition, since the sharp turning and the small turning are likely to be selected, the possibility of getting out of the portion Pb increases, and thus it is possible to avoid a situation in which the work does not proceed. As a result, according to the present embodiment, the work efficiency is appropriately improved.

Figure 8A:
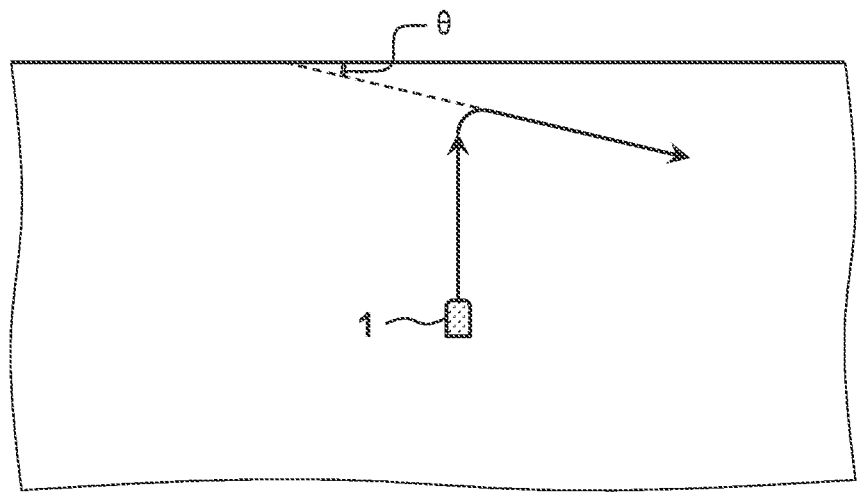
FIG. 8A is a diagram showing a turning mode of the work machine when the outer shape of the work region is complicated.

The large turning and the small turning may be performed based on the angle (angle θ) formed by the traveling direction of the work machine 1 after the turning of the work machine 1 and the extending direction of the boundary BD, as shown in FIG. 8A, instead of/in addition to the above-described turning angles (Φ1 and Φ2). That is, the large turning corresponds to a case where the angle θ is relatively large, and the small turning corresponds to a case where the angle θ is relatively small.

Figure 8B:
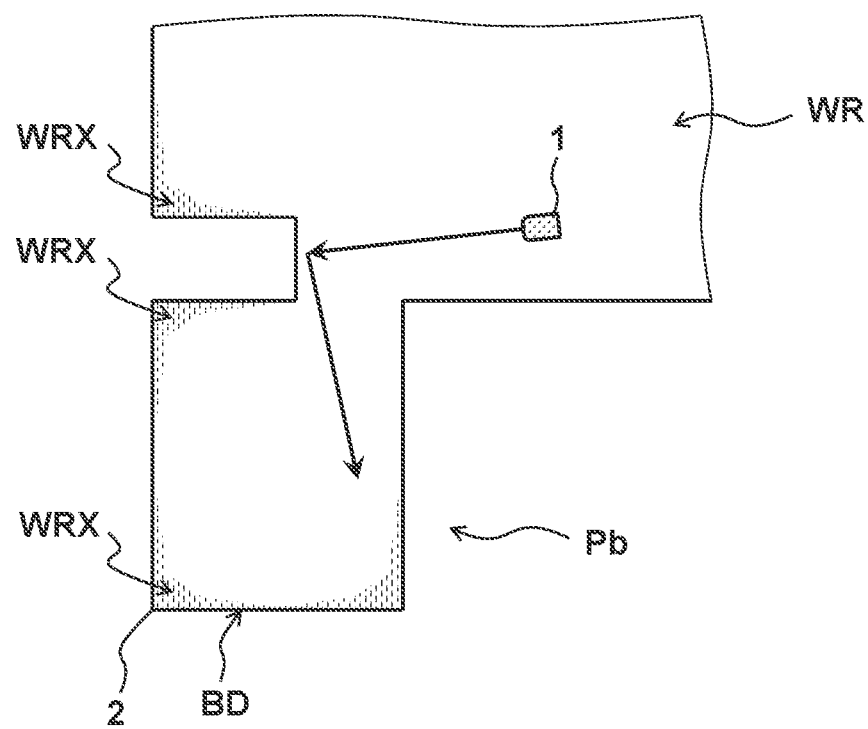
FIG. 8B is a diagram showing a turning mode of the work machine when the outer shape of the work region is complicated.

In other words, in the example of FIG. 7A, it can be said that the work by the work machine 1 can be executed up to the vicinity of the boundary BD by sharply turning the work machine 1 in a direction relatively parallel to the extending direction of the boundary BD. Further, in the example of FIG. 7B, it can be said that the entry of the work machine 1 into the complicated portion Pb can be more easily achieved (see FIG. 8B), and the work machine 1 can also be more easily achieved to get out of the portion Pb thereafter.

In the present embodiment, the mode of changing the probability of selection when one of several turning methods is selected (that is, the mode of changing the selection mode from several turning methods) based on the reference tables TA1, TA2, and TA3 has been exemplified, but the change of the turning mode is not limited to this example. For example, alternatively/incidentally, the change of the turning mode may be performed by adjusting or correcting the turning radius (r1 or the like) and/or the turning angle (Φ1 or the like) according to the detection of the complicated portion Pa or the like with reference to only the reference table TA1.

In the present embodiment, the two portions Pa and Pb are exemplified as the complicated portions of the work region WR, but the complicated portions can be classified into several types, and the above-described change of the turning mode may be performed based on the types. That is, two or more reference tables TA2 may be prepared corresponding to types of complicated portions.

(Example of Method of Determining Whether Shape of Boundary of Work Region is Complex)

The above-described S1020 (determination as to whether the shape of the boundary BD of the work region WR is complicated) is achievable by some known methods, and the complicated portion Pa or the like in the work region WR can be specified.

Figure 9A:
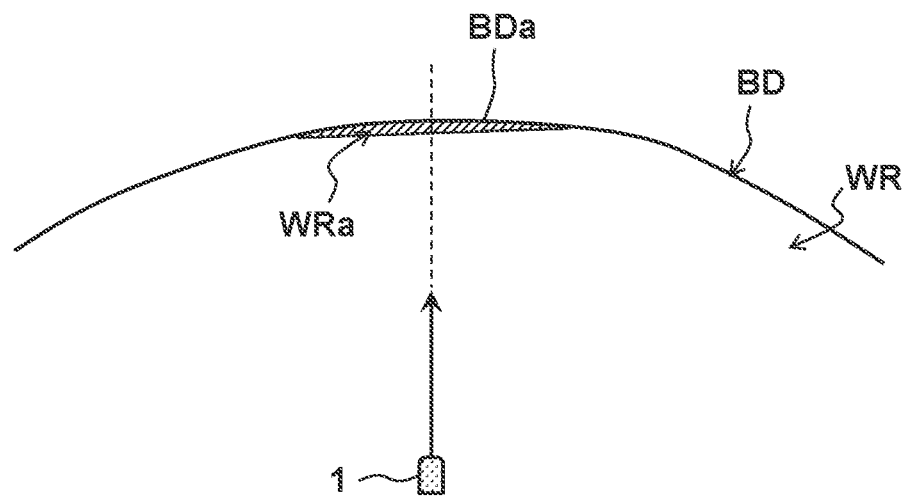
FIG. 9A is a diagram showing an example of a method of specifying the complicated portion in the work region.
Figure 9B:
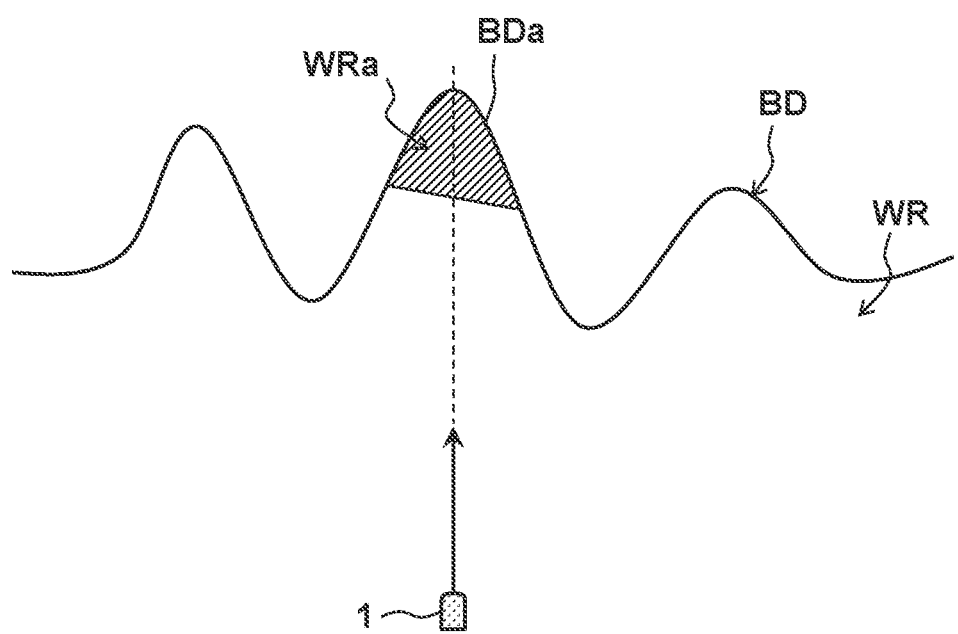
FIG. 9B is a diagram showing an example of a method of specifying the complicated portion in the work region.

FIGS. 9A and 9B show an example of a method of specifying the complicated portion Pa or the like. The complicated portion Pa or the like can be specified based on, for example, the area of the region WRa defined by a part BDa of the boundary BD. The part BDa is a part of a predetermined length including an intersection with an imaginary line following the traveling direction of the work machine 1 in the boundary BD. When the area of the region WRa defined by the part BDa is relatively small (see FIG. 9A), it can be said that the region WRa is not complicated. On the other hand, when the area of the region WRa defined by the part BDa is relatively large (see FIG. 9B), it can be said that the region WRa is complicated. According to such a method, the work machine 1 can appropriately specify the complicated portion Pa or the like while performing work.

Information indicating the part BDa and information indicating the area of the region WRa defined by the part BDa may be registered in advance in the storage unit 15 as information indicating the shape of the boundary BD. As a result, the complicated portion Pa or the like can be specified relatively easily.

Alternatively/incidentally, information indicating the shape itself of the boundary BD of the work region WR may be registered in the storage unit 15 as map information. In this case, the complicated portion Pa or the like can be relatively easily specified by referring to the map information. The map information may be generated or updated by the control unit 14 based on the specified complicated portion Pa or the like. As a result, the map information can be utilized for a subsequent work plan, and thereby the work efficiency can be further improved.

As another embodiment, the complicated portion Pa or the like may be specified by analyzing the detection result of the electromagnetic wave detection unit 131. A pulse voltage for generating an electromagnetic wave can be repeatedly/intermittently applied to the area wire 2 at a predetermined cycle. Therefore, the portion Pa or the like can be specified relatively easily by analyzing the detection result (temporal change of the waveform of the electromagnetic wave) of the electromagnetic wave detection unit 131 using a known analysis model.

As another embodiment, alternatively/incidentally, the complicated portion Pa or the like can be specified based on the time during which the work machine 1 turns within a predetermined period. For example, when the number of executions (frequency) of turning of the work machine 1 is relatively large, it can be said that the peripheral region is the complicated portion Pa or the like.

As described above, in the present embodiment, the work machine 1 moves straight in the work region WR until approaching the boundary BD (S1000). Therefore, for the same purpose as described above, the complicated portion Pa or the like can alternatively/incidentally be specified based on the time during which the work machine 1 moves straight within a predetermined period. For example, when the work machine 1 moves straight for a relatively short time, it can be said that the peripheral region is the complicated portion Pa or the like. Alternatively, the complicated portion Pa or the like may be specified based on a ratio of a time during which the work machine 1 turns and a time during which the work machine 1 moves straight.

The shape of the work region WR is registered in the map information described above, and can be acquired from the map information. Based on the map information, for example, in a case where a part of the area wire 2 facing the work machine 1 (in front of the work machine 1) is installed so as to be separated from other portions (for example, in a case where there is a so-called narrow path (a shape corresponding to the entrance of the portion Pb in FIG. 4B)), it can be said that the region is the complicated portion Pa or the like. The same applies to a case where there are a plurality of narrow paths, a case where the length of the narrow path is equal to or more than the criterion, and the like.

As still another embodiment, the complexity of the shape of the boundary BD can be evaluated based on the ratio of the area of the entire work region WR and the length of the area wire 2. For example, when the area wire 2 defining the work region WR is relatively long with respect to the area of the entire work region WR, it can be often said that the shape of the boundary BD is complicated.

As described above, in the present embodiment, the work machine 1 can detect vibration applied to the work machine 1 by the vibration detection unit 132. Therefore, for the same purpose as described above, the complicated portion Pa or the like can be specified based on the number of times of detection of vibration within a predetermined period. For example, when the number of times of detection (frequency) of vibration of the work machine 1 is relatively large, it can be said that the peripheral region is the complicated portion Pa or the like.

It is possible to relatively easily specify the complicated portion Pa or the like by any of the above-described methods.

As described above, in the present embodiment, it is determined whether the shape of the boundary BD is complicated for ease of understanding, but the complexity of the shape may be evaluated and classified into a plurality of levels based on the degree of the complexity. Therefore, the above-described identification can also be said to be a part of this evaluation. As an example, an evaluation result for a certain degree of complexity is set as a first evaluation value, and an evaluation result with a higher degree of complexity (more complicated) is set as a second evaluation value. At this time, the selection mode of the embodiment can also be said to set the probability or frequency of selection of the sharp turning mode in the case of the second evaluation value to be higher than that in the case of the first evaluation value.

SUMMARY

According to the present embodiment, the work machine 1 performs work while moving straight in the work region WR (S1000), and turns so as to travel inside the boundary BD when the boundary BD of the work region WR is detected (S1200). When the work machine 1 specifies the portion Pa or the like in which the shape of the boundary BD is complicated in the work region WR (S1010, S1020), the work machine 1 changes the turning mode of the work machine 1 in the specified portion Pa or the like (S1040). That is, when the complicated portion Pa or the like in the shape of the boundary BD of the work region WR is specified, the turning mode of the work machine 1 is made different from the case where the complicated portion Pa or the like is not specified. According to such travel control, the work can be continued by appropriately achieving the turning in the complicated portion Pa or the like, and the work efficiency can be improved.

(Others)

In the above-described embodiment, the control unit 14 is mounted on the work machine 1, but may be configured to be capable of communicating with the work machine 1 and installed at a position separated from the work machine 1. That is, the travel control for the work machine 1 described in the embodiment may be achieved by remote control by a control device corresponding to the control unit 14. The same effects as those in the embodiment are enabled also in such a method.

In the embodiment, the lawn mower is exemplified as the work machine 1, but the work machine 1 is not limited to the lawn mower. That is, the contents of the embodiment can also be applied to a snow blower including an auger as the work unit 12, or can also be applied to an agricultural work machine such as a cultivator.

In the present embodiment, the mode in which the work region WR is partitioned by the area wire 2 that generates the electromagnetic wave has been exemplified, but the work region WR may be partitioned by an installation object such as a fence or a pole. In this case, instead of the electromagnetic wave detection unit 131, an imaging unit capable of imaging the surrounding environment of the work machine 1, such as an electronic camera including a CMOS image sensor, may be used. A pair of left and right imaging units can be provided to measure the distance to the imaging target based on, for example, triangulation (these may also be referred to as compound-eye cameras).

In addition, the imaging unit replacing the electromagnetic wave detection unit 131 also functions as an obstacle detection unit, that is, it is possible to achieve a function similar to the function for detecting the obstacle OB by the vibration detection unit 132. Alternatively, a millimeter wave radar, light detection and ranging (LIDAR), or the like may be used instead of/in addition to the imaging unit. According to such a non-contact sensor, the work machine 1 can detect the obstacle OB without contacting the obstacle OB. In the present embodiment, when the obstacle OB is newly detected by such a non-contact sensor, information indicating the obstacle OB is registered or updated in the map information. The complicated portion Pa or the like can also be specified based on the number of times of detection within a predetermined period. For example, when the number of times of detection (frequency) of the obstacle OB is relatively large, it can be said that the peripheral region is the complicated portion Pa or the like.

In the above description, for ease of understanding, each element is indicated by a name related to its functional aspect, but each element is not limited to one having the content described in the embodiment as a main function, and may be one having the content supplementarily.

Summary of Embodiment

The 1st embodiment relates to a control unit (14) for executing travel control of a self-propelled work machine (1), comprising a turning unit (S1200) that turns the work machine such that the work machine travels inside a boundary (BD) of a work region (WR), an evaluation unit (S1020) that evaluates complexity of a shape of the boundary in the work region, and a changing unit (S1040) that changes a turning mode of the work machine when the work machine is turned based on an evaluation result by the evaluation unit.

For example, when the complicated portion in the shape of the boundary of the work region is specified, the turning mode of the work machine is made different from the case where the complicated portion is not specified. As a result, the work can be continued by appropriately achieving the turning in the complicated portion, and the work efficiency can be improved. Note that, in the embodiment, for ease of understanding, the mode in which the complicated portion is specified has been exemplified, but the complexity of the shape may be evaluated and classified into a plurality of levels based on the degree of the complexity. In this case, relative evaluation is performed, for example, as to which of a plurality of criteria is complicated.

In the 2nd embodiment, the control device further comprises a selection unit (S1200, TA1, TA2) that includes, as a travel control mode, two or more turning modes (a sharp turning mode, a gentle turning mode) in which the work machine is turned with different turning radii such that the work machine travels inside the boundary, and selects one of the two or more turning modes based on a predetermined criterion, wherein the turning unit turns the work machine based on the turning mode selected by the selection unit, and wherein the changing unit changes the criterion of the selection by the selection unit based on an evaluation result by the evaluation unit.

For example, the turning in the boundary of the work region is performed by selecting one turning mode from two or more turning modes with a predetermined probability, so that the work without unevenness is performed in the entire work region in the long term. In such a work mode, when the complicated portion in the shape of the boundary of the work region is specified, the first aspect can be appropriately achieved by changing the probability of the selection. Note that, in the embodiment, for ease of understanding, the mode in which the selection is performed based on the probability has been exemplified, but the selection may be performed based on working time (that is, frequency). For example, it can be said that the selection in a certain work time (for example, 5 minutes) is more easily performed than a work time shorter than the certain work time (for example, 1 minute).

In the 3rd embodiment, the two or more turning modes include a first turning mode (a sharp turning mode) in which the work machine is turned with a first turning radius (r1), and a second turning mode (a gentle turning mode) in which the work machine is turned with a second turning radius (r2) larger than the first turning radius, that the selection unit selects one of the two or more turning modes with a predetermined probability, and that the evaluation unit evaluates a degree of complexity of a shape of the boundary, and when a certain degree of complexity that is an evaluation result is defined as a first evaluation value and a degree of complexity that is larger than the first evaluation value is defined as a second evaluation value, the changing unit sets a probability that the selection unit selects the first turning mode from the first turning mode and the second turning mode when the evaluation result is the second evaluation value to be higher than when the evaluation result is the first evaluation value.

As a result, the 2nd embodiment can be appropriately achieved.

In the 4th embodiment, the two or more turning modes include a first turning mode (a sharp turning mode) in which the work machine is turned with a first turning radius (r1), and a second turning mode (a gentle turning mode) in which the work machine is turned with a second turning radius (r2) larger than the first turning radius, and that the evaluation unit evaluates a degree of complexity of a shape of the boundary, and when a certain degree of complexity that is an evaluation result is defined as a first evaluation value and a degree of complexity that is larger than the first evaluation value is defined as a second evaluation value, the changing unit sets a frequency at which the selection unit selects the first turning mode from the first turning mode and the second turning mode when the evaluation result is the second evaluation value to be higher than when the evaluation result is the first evaluation value.

As a result, the 2nd embodiment can be appropriately achieved.

In the 5th embodiment, when an angle formed by a traveling direction of the work machine after the turning and a direction in which the boundary extends when the turning unit turns the work machine is denoted by θ (see FIG. 8A), the changing unit sets the angle θ when the evaluation result by the evaluation unit is the second evaluation value to be smaller than when the evaluation result is the first evaluation value.

As a result, it may be possible to appropriately achieve the work of the complicated portion in the shape of the boundary of the work region.

In the 6th embodiment, the evaluation unit includes a specification unit that specifies a portion in which a shape of the boundary is complicated based on an area of a region (WRa) defined by a part (BDa) of a predetermined length in the boundary in the work region.

As a result, the work machine can appropriately specify the complicated portion while performing work.

In the 7th embodiment, the control device further comprises a registration unit that registers information indicating a shape of the boundary of the work region, characterized in that the evaluation unit performs the evaluation based on the information registered by the registration unit.

As a result, the work machine can relatively easily evaluate the complexity of the shape of the boundary of the work region when performing work.

In the 8th embodiment, the evaluation unit performs the evaluation based on a time during which the turning unit turns the work machine within a predetermined period.

As a result, the above evaluation can be achieved relatively easily.

In the 9th embodiment, the control device further comprises a straight-moving unit (S1000) that causes the work machine to move straight in the work region until the work machine approaches the boundary, characterized in that the evaluation unit performs the evaluation based on a time during which the straight-moving unit causes the work machine to move straight within a predetermined period.

As a result, the above evaluation can be achieved relatively easily.

In the 10th embodiment, the control device further comprises an obstacle detection unit (13, 132) that detects an obstacle (OB), characterized in that the evaluation unit performs the evaluation based on the number of obstacles detected by the obstacle detection unit.

As a result, the above evaluation can be achieved relatively easily.

In the 11th embodiment, the control device further comprises a detection unit (13, 132) that detects vibration applied to the work machine, characterized in that the turning unit further turns the work machine when the vibration is detected by the detection unit.

As a result, the work can be resumed while avoiding the obstacle.

In the 12th embodiment, the evaluation unit performs the evaluation based on the number of times of detection of vibration by the detection unit within a predetermined period.

As a result, the above evaluation can be achieved relatively easily.

In the 13th embodiment, the control device further comprises a generation unit that generates map information on the work region, characterized in that the generation unit updates the map information based on an evaluation result by the evaluation unit.

This makes it possible to improve the work efficiency by utilizing the map information in a subsequent work plan.

The 14th embodiment relates to a work machine comprises the above-mentioned control unit (14), and a work mechanism (12) for performing predetermined work.

That is, the control device described above can be suitably applied to a known work machine.

The invention is not limited to the foregoing embodiments, and various variations/changes are possible within the spirit of the invention.

The invention claimed is:

1. A control device for executing travel control of a self-propelled work machine, the control device comprising:
   at least one processor circuit with a memory comprising instructions, that when executed by the processor circuit, cause the at least one processor circuit to at least:
   turn the work machine such that the work machine travels inside a boundary of a work region;
   evaluate complexity of a shape of the boundary in the work region;
   change a turning mode of the work machine when the work machine is turned based on a result of the evaluation of the complexity of the shape of the boundary in the work region; and
   select one of two or more turning modes as a travel control mode based on a predetermined criterion, where the work machine is turned with different turning radii in the respective two or more turning modes such that the work machine travels inside the boundary,
   wherein the work machine is turned based on the one of the two or more turning modes selected,
   wherein the criterion of the selection is changed based on the evaluation of the complexity of the shape of the boundary in the work region,
   wherein the two or more turning modes include:
   a first turning mode in which the work machine is turned with a first turning radius; and
   a second turning mode in which the work machine is turned with a second turning radius larger than the first turning radius,
   wherein in the selection of the one of the two or more turning modes, the first turning radius is selected at a first frequency and the second turning radius is selected at a second frequency, and
   wherein the evaluating evaluates a degree of complexity of the shape of the boundary, and wherein a first degree of complexity that is the result of the evaluation is defined as a first evaluation value, and a second degree of complexity is defined as a second evaluation value, the second degree of complexity being larger than the first degree of complexity, and
   the first frequency is set when the result of the evaluation is the first evaluation value, and the second frequency is set when the result of the evaluation is the second evaluation value, where the second frequency is higher than the first frequency.

2. The control device according to claim 1, wherein when an angle formed by a traveling direction of the work machine after the turning and a direction in which the boundary extends when the the work machine is turned is denoted by θ,
   the angle θ when the result of the evaluation is the second evaluation value is set to be smaller than when the result of the evaluation is the first evaluation value.

3. The control device according to claim 1, wherein a portion is specified in which the shape of the boundary is complicated based on an area of a region defined by a part of a predetermined length in the boundary in the work region.

4. The control device according to claim 1, wherein the instructions further cause the at least one processor circuit to at least register information indicating the shape of the boundary of the work region, and
   wherein the evaluation is performed based on the information registered.

5. The control device according to claim 1, wherein the shape of the boundary is evaluated as complex in a case where a time during which the work machine is turned within a predetermined period reaches a reference.

6. The control device according to claim 1, wherein the instructions further cause the at least one processor circuit to at least cause the work machine to move straight in the work region until the work machine approaches the boundary, and
   wherein the shape of the boundary is evaluated as complex in a case where a time during which the work machine is caused to move straight within a predetermined period reaches a reference.

7. The control device according to claim 1, wherein the instructions further cause the at least one processor circuit to at least detect an obstacle, and
   wherein the evaluation is performed based on the number of obstacles detected.

8. The control device according to claim 1, wherein the instructions further cause the at least one processor circuit to at least detects a vibration applied to the work machine, and
   wherein the work machine is turned when the vibration is detected.

9. The control device according to claim 8, wherein the evaluation is performed based on the number of times the vibration is detected within a predetermined period.

10. The control device according to claim 1,
wherein the instructions further cause the at least one processor circuit to at least generate map information on the work region, and
wherein the map information is updated based on the result of the evaluation.

11. A work machine comprising:
the control device according to claim 1; and
a work mechanism for performing predetermined work.

12. A control device for executing travel control of a self-propelled work machine, the control device comprising:
at least one processor circuit with a memory comprising instructions, that when executed by the processor circuit, cause the at least one processor circuit to at least:
turn the work machine such that the work machine travels inside a boundary of a work region;
evaluate complexity of a shape of the boundary in the work region;
change a turning mode of the work machine when the work machine is turned based on a result of the evaluation of the complexity of the shape of the boundary in the work region; and
select one of two or more turning modes as a travel control mode based on a predetermined criterion, where the work machine is turned with different turning radii in the respective two or more turning modes such that the work machine travels inside the boundary,
wherein the work machine is turned based on the respective one of the two or more turning modes selected,
wherein the criterion of the selection is changed based on the evaluation of the complexity of the shape of the boundary in the work region,
wherein in the selection of the one of the two or more turning modes, the first turning radius is selected at a first frequency and the second turning radius is selected at a second frequency, and
wherein the two or more turning modes include:
a first turning mode in which the work machine is turned with a first turning radius; and
a second turning mode in which the work machine is turned with a second turning radius larger than the first turning radius, and
wherein the evaluating evaluates a degree of complexity of the shape of the boundary, and wherein a first degree of complexity that is the result of the evaluation is defined as a first evaluation value, and a second degree of complexity is defined as a second evaluation value, the second degree of complexity being larger than the first degree of complexity, and
the first frequency is set when the result of the evaluation is the first evaluation value, and the second frequency is set when the result of the evaluation is the second evaluation value, where the second frequency is higher than the first frequency.

* * * * *